United States Patent [19]
Lester et al.

[11] Patent Number: 5,731,550
[45] Date of Patent: Mar. 24, 1998

[54] ACOUSTIC DIPOLE WELL LOGGING INSTRUMENT

[75] Inventors: Robert A. Lester; Paul Junghans, both of Houston, Tex.

[73] Assignee: Western Atlas International, Inc., Houston, Tex.

[21] Appl. No.: 813,922

[22] Filed: Mar. 7, 1997

[51] Int. Cl.$^6$ ........................................ G01V 1/40
[52] U.S. Cl. ........................ 181/102; 181/122; 367/25; 367/911; 73/152.02
[58] Field of Search .................. 73/152.02; 181/102, 181/105, 122, 104; 367/911, 25

[56] References Cited

U.S. PATENT DOCUMENTS

| | | | |
|---|---|---|---|
| 4,365,321 | 12/1982 | von Bose | 367/25 |
| 4,823,125 | 4/1989 | Rorden et al. | 367/911 |
| 4,872,526 | 10/1989 | Wignall et al. | 181/102 |
| 4,987,969 | 1/1991 | Boyle et al. | 181/102 |
| 5,043,952 | 8/1991 | Hoyle et al. | 367/159 |
| 5,229,553 | 7/1993 | Lester et al. | 181/102 |
| 5,343,001 | 8/1994 | Cowles et al. | 181/102 |
| 5,357,481 | 10/1994 | Lester et al. | 367/31 |

*Primary Examiner*—J. Woodrow Eldred
*Attorney, Agent, or Firm*—Richard A. Fagin

[57] ABSTRACT

A dipole acoustic well logging instrument including an acoustic transmitter. Receiver sections are disposed at axially spaced apart locations from the acoustic transmitter. Each receiver section includes an outer shoulder at each end adapted to be placed in acoustically isolated contact with an internal shoulder of a connector coupling when the instrument is in tension. The outer shoulders have an acoustically isolating material disposed on their surfaces. The receiver sections include an inner shoulder at each end adapted to be placed in direct contact with an external shoulder of the connector coupling when the instrument is in compression. The instrument includes one connector couplings disposed at each end of each receiver section to couple the receiver sections to each other and to the remainder of the instrument. At least one receiver element is disposed in a passage formed into each of the receiver sections. In one embodiment of the invention, the receiver element can be a bimorph-type dipole acoustic sensor. In another embodiment, the receiver element can be formed from a plurality of radially spaced apart piezoelectric elements.

12 Claims, 2 Drawing Sheets

ACOUSTIC DIPOLE WELL LOGGING INSTRUMENT

BACKGROUND OF THE INVENTION

1. Field of the Invention

The invention is related to the field of acoustic velocity well logging instruments. More specifically, the invention is related to dipole acoustic well logging instruments having acoustic isolation along the instrument between individual receiver elements in an array of such receiver elements.

2. Description of the Related Art

Acoustic dipole well logging instruments are used for, among other purposes, making measurements related to the shear propagation velocity and the compressional propagation velocity of earth formations penetrated by a wellbore. Typically the acoustic propagation velocity measurements are made when the wellbore is filled with a liquid such as drilling mud. Since shear waves will not propagate through the liquid, the shear propagation velocity is typically measured using some form of "dipole", or "flexural" acoustic energy source. See for example U.S. Pat. No. 4,782,910 issued to Sims. Dipole sources can be difficult to use in a well logging instrument because the acoustic waves that they generate (called flexural waves) are susceptible to direct propagation along the housing of the instrument itself. Separating the directly propagated waves from those which have traveled through the earth formation in the signals generated by receivers can be difficult. Directly propagated waves in the received signals makes the task of determining velocity of the formation difficult. This problem has been largely overcome in the case of compressional acoustic energy by "slotting" or otherwise modifying the instrument housing so that the compressional energy takes longer to propagate along the housing than it does through the earth formation. This technique has proven less effective for flexural waves, however.

One solution to the problem of direct propagation of flexural waves is described in U.S. Pat. No. 5,229,553 issued to Lester et al. The apparatus disclosed in this patent includes an acoustic isolator unit which substantially reduces direct propagation of acoustic waves from the transmitters to the receiver array along the instrument housing. A drawback to using the acoustic isolator described in the Lester et al '553 patent, without more, is that the receiver elements are still disposed in a rigid, acoustically conductive housing. It has been observed that some flexural waves can still propagate, at the flexural velocity of the housing material, directly along the receiver array portion of the instrument housing after emerging from the wellbore. This can cause the difficulty to persist in identifying, in the receiver signals, the flexural waves actually propagating through the earth formation.

One solution to the problem of flexural wave propagation along the receiver section of the instrument housing is described in U.S. Pat. No. 5,343,001 issued to Cowles et al. The Cowles et al patent describes an apparatus wherein each receiver, in an array of such receivers, is acoustically isolated from the other receivers by disposing each of the individual receiver elements in a "chassis" assembly and acoustically isolating the chassis assemblies from each other using compliant spacers or similar acoustically non-transmissive device in between the chassis assemblies. One drawback to the Cowles '001 apparatus is that under some circumstances it is necessary for the apparatus to include a rigid metal "jacket" surrounding the exterior of the receiver array. The jacket provides the receiver array with some measure of rigidity in compression for wellbore conditions where such rigidity is necessary to "push" the logging instrument into the wellbore. The jacket includes acoustic windows to enable acoustic energy from the wellbore to reach the individual receiver elements in the array. The jacket is also "slotted" to slow the flexural velocity along the jacket to a value enabling flexural waves travelling along the jacket to be discriminated from the flexural waves travelling through the earth formation. The discrimination between flexural waves travelling along the jacket from those travelling through the formation provided by this instrument has proven inadequate when the jacket is used, however. It has been observed that some residual energy from the flexural waves travelling along the jacket is present in the signals attributed to the flexural waves travelling along the earth formation. Although it is possible to use the Cowles '001 apparatus without the jacket, this has proven to be commercially acceptable under a variety of adverse wellbore conditions. It is generally desirable for any well logging instrument to be able to remain substantially rigid under high compressional force in order that the instrument may be conveyed, as previously explained, by a drill pipe or similar "pushing" mechanism into highly inclined or horizontal wellbores. It is also desirable for any well logging instrument to be able to withstand 30,000 to 50,000 pounds or more of tension in order to be able to extract the instrument from a wellbore in which it has become stuck (typically as a result of differential fluid pressure). Having the receiver chassis assembled as described in the Cowles et al '001 patent, by using a section of cable as the support means, results in an instrument which has difficulty meeting the previously described commercial requirements for rigidity in compression and tensile strength.

The invention is intended to provide improved acoustic response to flexural waves travelling through the earth formations with substantial reduction in the magnitude of flexural waves propagating along the instrument housing, while having the rigidity and tensile strength of the typical well logging instrument assembled within a rigid, high tensile strength housing.

SUMMARY OF THE INVENTION

The invention is a dipole acoustic well logging instrument including a dipole acoustic transmitter and receiver sections disposed at axially spaced apart locations from the dipole acoustic transmitter. Each receiver section includes an outer shoulder at each end, adapted to be placed in acoustically isolated contact with an internal shoulder of a connector coupling when the instrument is in tension. The outer shoulders have an acoustically isolating material disposed on their surfaces. The receiver sections include an inner shoulder at each end adapted to be placed in direct contact with an external shoulder of the connector coupling when the instrument is in compression. The instrument includes one connector coupling disposed at each end of each receiver section to couple the receiver sections to each other and to the remainder of the instrument. At least one receiver element is disposed in a passage formed into each of the receiver sections.

In one embodiment of the invention, the receiver element can be a bimorph-type dipole acoustic sensor. In another embodiment, the receiver element can be formed from a plurality of radially spaced apart piezoelectric elements. The signals from each piezoelectric element in the receiver section can be summed to synthesize the response of a compressional acoustic sensor, and signals from opposing pairs of the piezoelectric elements can be subtracted from each other to synthesize the response of a dipole acoustic sensor.

The instrument may also include a compressional (monopole) transmitter disposed proximal to the dipole transmitter.

DESCRIPTION OF THE PREFERRED EMBODIMENT

Figure 1:
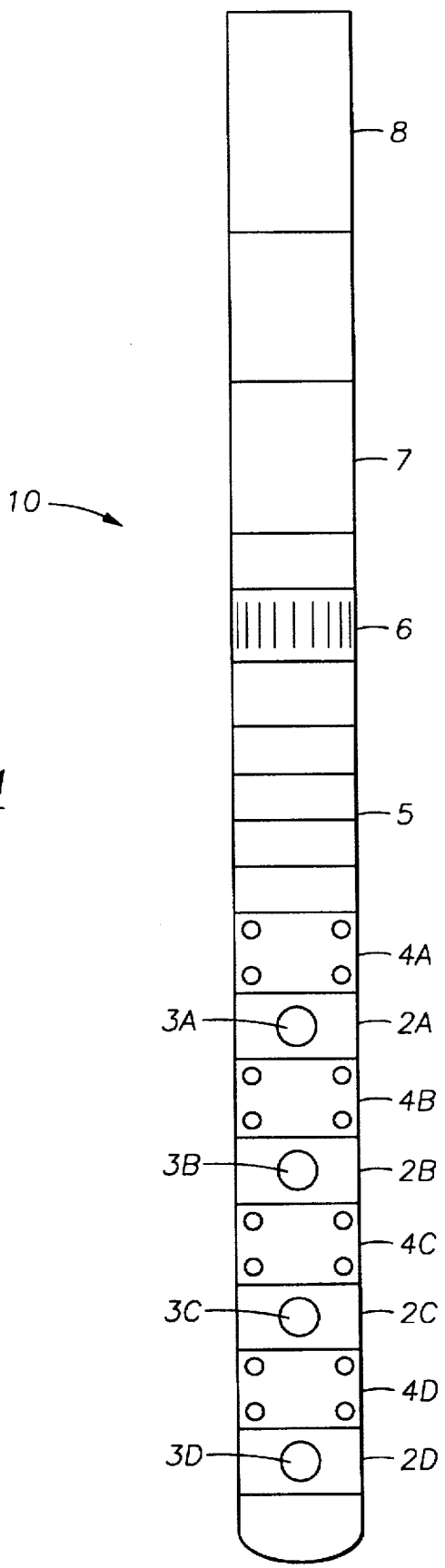
FIG. 1 shows an overview of a dipole acoustic well logging instrument according to the invention.

An overview of an acoustic dipole well logging instrument according to the invention is shown at 10 in FIG. 1. The instrument 10 can include an "array" comprising a plurality of receiver sections shown at 2A, 2B, 2C and 2D. The receiver sections 2A–2D are coupled to each other, and to the remainder of the instrument 10 by "clamshell"-type connectors 4A, 4B, 4C and 4D. The clamshell connectors 4A, 4B, 4C and 4D will be further explained. Each receiver section 2A–2D can include therein a receiver element, 3A–3D, respectively. The receiver elements 3A–3D detect acoustic waves and generate electrical signals corresponding in amplitude to the magnitude of the acoustic waves. The receiver elements 3A–3D can be so-called "bimorph" dipole elements, which are sensitive primarily to flexural energy propagating along one direction of particle motion, and are substantially insensitive to compressional energy, as described in a sales brochure entitled, *Multipole Array Acoustilog*, Western Atlas Logging Services, Houston, Tex. (1993). Typically the receiver elements 3A–3D are positioned so that their sensitive axes are substantially parallel to each other, and are perpendicular to the axis of the instrument 10. The receiver elements 3A–3D may alternatively, or in combination with the bimorph dipole elements, each consist of four individual piezoelectric elements positioned around the circumference of each receiver section 2A–2D at approximately 90 degrees azimuthal spacing from each other receiver element in that particular receiver section. The electrical signals generated by the individual piezoelectric elements in any one receiver section can be summed to simulate the signal response of an acoustic receiver which is primarily sensitive to compressional acoustic energy (a so-called "monopole" receiver element). The difference between the electrical signals of opposing pairs of the piezoelectric elements in any particular receiver section can also be determined to generate the equivalent of the response of one of the previously described bimorph dipole receiver elements. It should be understood that the invention is not limited to using piezoelectric elements for the receiver elements located circumferentially about the receiver section 2. It is only necessary that the individual receiver element be of a type which is sensitive to particle motion along a single axis substantially perpendicular to the axis of the instrument 10.

The assemblage of receiver sections 2A–2D and clamshells 4A–4D can be coupled to one end of an acoustic isolator such as the one described in U.S. Pat. No. 5,229,553 issued to Lester et al. It has been determined by laboratory experiment that the configuration of the receiver sections 2A–2D and the clamshells 4A–4D as shown in FIG. 1 will provide sufficient acoustic isolation between the individual receiver sections 2A–2D to attenuate flexural waves propagating along the instrument 10 when those flexural waves are caused by energy arriving from the wellbore. It may be desirable, however, to provide additional acoustic isolation between the transmitters 6, 7 (which will be further explained) and the assemblage of receiver sections 2A–2D on the instrument 10, therefore the isolator 5 may be included to provide this additional acoustic isolation.

The instrument 10 can include a monopole, or compressional, acoustic energy source 6, or transmitter, of types well known in the art. The instrument 10 also includes a dipole acoustic transmitter 7. Preferably the dipole transmitter 7 is similar in design to one disclosed in U.S. Pat. No. 4,782,910 issued to Sims, but this is not meant to be an exclusive representation of dipole transmitters which will work with the invention. If the receiver elements 3A–3D are the previously described bimorph dipole-type, then the sensitive axis of each receiver element 3A–3D should be substantially aligned with the axis of the flexural wave energy output of the dipole transmitter 7. An additional dipole transmitter (not shown) having its energy output axis azimuthally separated from the output of the dipole transmitter 7 by 90 degrees may also be included in the instrument 10. If the additional dipole transmitter (not shown) is used, then preferably some of the receiver elements 3A–3D should have their sensitive axes aligned with the energy output axis of the additional dipole transmitter (not shown). Alternatively, the receiver sections 2A–2D can each include the four individual piezoelectric elements, as previously described. Using the four piezoelectric elements in each receiver section 2A–2D, flexural wave-induced signals may be received which originate from either one of the dipole transmitters by measuring the signal differences, in each receiver section 2A–2D, between the opposing pairs of the individual piezoelectric receiver elements which are axially aligned with one of the dipole transmitters.

The instrument 10 can also include a telemetry/control unit 8, which includes circuits for actuating the transmitters 6, 7 either upon command from the earth's surface or in a free-running, or uncontrolled, manner. The telemetry/control unit 8 also includes circuits for amplifying and conditioning the electrical signals generated by each one of the receiver elements 3A–3D for transmission to the earth's surface either in analog, or preferably, in digital form. These circuits are well known in the art.

It is to be clearly understood that the number of receiver sections 2A–2D and clamshell connectors 4A–4D as shown in FIG. 1 is meant only to illustrate the general configuration of the instrument 10 of the invention and is not meant to limit the invention. More or fewer receiver sections 2A–2D and associated clamshells 4A–4D may be included in any particular embodiment of the instrument 10 of the invention. In commercial practice, a typical number of receiver sections is about six, having the receiver elements therein axially spaced apart at about 12 inches from each other to provide a receiver array having an aperture of about 5 feet.

It should also be clearly understood that the location of the receiver sections 2A–2D relative to the transmitters 6, 7 as shown in FIG. 1 is a matter of convenience for the system designer and should not be construed as a limitation on the invention. Having the transmitters 6, 7 on the bottom of the instrument 10 would also function properly. However, locating the receiver sections 2A–2D nearer to the bottom of the instrument 10 enables the instrument 10 to measure earth formations nearer to the bottom of the wellbore, as is understood by those skilled in the art.

Figure 2:
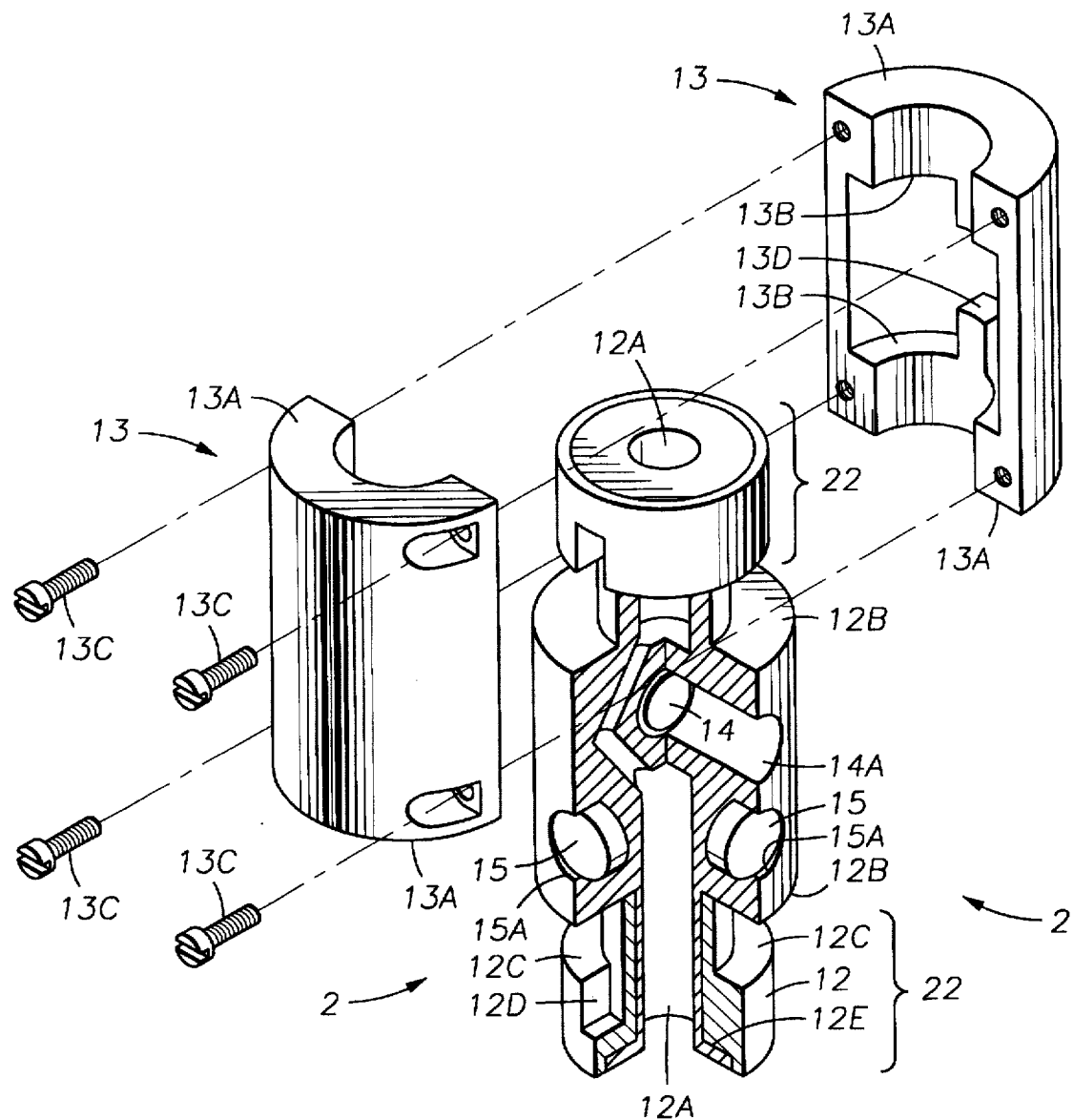
FIG. 2 shows the receiver section and clamshell connectors of the invention in more detail.

A receiver section and its associated clamshell connectors are shown in more detail in FIG. 2. The receiver section 2 can be made of steel or other high strength material, and is formed generally into a spool having upset ends 22, into a "dumbbell" shape. The upset ends 22 of the receiver section 2 are each to be disposed under clamshell half-sections 13. The clamshell half-sections 13 can be fastened together using capscrews 13C or the like to form each individual clamshell connector (4A–4D in FIG. 1). The upset ends 22 are covered on their inner surfaces with an elastomer covering 12, or any similar material which can substantially attenuate acoustic energy propagation. The elastomer covering 12 provides acoustic isolation between the clamshell half-sections 3 and the receiver section 2. The receiver section 2 can include a through passage 14A if the bimorph receiver element 14 is used, and/or can include four azimuthally spaced apart chambers 15A for each one of the four piezoelectric elements, shown at 15. The receiver section 2 can also include a through passage 12A for enabling electrical wiring (not shown) to pass through to the remainder of the body of the instrument 10, and to provide a place for electrical connections to the individual receiver elements 14, 15 to eventually pass through to the telemetry/control unit (8 in FIG. 1).

Two clamshell half-sections 13 are coupled together, as previously explained, on each upset end 22 of one of the receiver sections 2, to couple that particular receiver section 2 to the another receiver section 2 or couple the receiver section 2 to the remainder of the instrument 10. Each clamshell half-section 13 is internally recessed to fit over the upset ends 22 of two contiguous receiver sections. In a typical well logging operation, the instrument 10 is withdrawn from a wellbore while the instrument 10 makes measurements. While being withdrawn from the wellbore, the instrument is put in tension. This causes an inner surface 12C of the elastomer cover 12 which is normally in contact with an inner surface 13B on each of the clamshell half-sections 13, to be compressed slightly, whereby outer surfaces 13A of the clamshell half-sections 13 are withdrawn from contact with a shoulder 12B of the receiver section 2. Under tensile conditions, the only contact between the receiver section 2 and the clamshell half-sections 13 is through the elastomer cover 12 so that the receiver sections 2 are acoustically isolated from each other and from the remainder of the instrument 10.

Should the instrument 10 become stuck in the wellbore and require extreme tension to extract it from the wellbore, the extreme tension will cause the elastomer 12 to extrude from between the clamshell half-sections 13 and the receiver sections 2, so that the inner surface 13B of the clamshell half-sections 13 will contact an inner shoulder 12E of the receiver section 2. This can provide the instrument 10 with the capability of withstanding sufficient tension to enable its extraction from the wellbore if it becomes stuck by differential fluid pressure and/or other well known causes of instrument sticking in the wellbore.

If the instrument 10 is put in compression, then an outer surfaces (shoulder) 13A of the clamshell half-sections 13 will be placed in contact with the shoulder 12B of the receiver section 2. When compressed, the receiver sections 2 and clamshells (3 in FIG. 1) will act as a series of stacked cylinders and become substantially inflexible. Under compression the instrument 10 may be inserted by pushing into a highly inclined or horizontal wellbore.

The elastomer cover 12 can include indexing notches, such as shown at 12D. The indexing notches 12D are adapted to receive corresponding index tangs 13D formed into the inside of each clamshell half-section 13. It has been determined that by positioning the indexing notches 12D and corresponding indexing tangs 13D to be azimuthally separated by about 90 degrees with respect to the passage 14A containing the bimorph element 14, that the attenuation of undesirable flexural wave transmission along the instrument 10 is substantially improved. Positioning the indexing tangs 13D and the corresponding notches 12D at 90 degrees to the passage 14A has the effect of positioning the most flexible direction of the assembled receiver sections and clamshells in the same direction as the propagation of flexural waves and the sensitive axis direction of the bimorph element 14. If signals from opposing pairs of piezoelectric elements 15 are subtracted from each other to synthesize the response of the bimorph 14, as previously explained, then the opposing pairs of piezoelectric elements 15 should be azimuthally separated about 90 degrees with respect to the azimuthal direction of the indexing tangs 13D and corresponding notches 12D.

The assemblage of receiver sections 2 and clamshell half sections 13 will be recognized as being quite similar in design to an acoustic isolator for a well logging instrument described in U.S. Pat. No. 5,229,553 issued to Lester et al. The difference between the isolator in the Lester et al '553 patent and the receiver sections and clamshells in this invention is that in this invention the receiver elements are located in the receiver sections themselves. The isolator described in the Lester et al '553 patent was intended to include a plurality of axially contiguous acoustic isolation elements so as to provide sufficient overall attenuation of the flexural waves propagated along the body of the instrument between the transmitter and the receiver array. What is not apparent from the Lester et al '553 patent is whether a single isolator section of the type described therein will provide enough acoustic isolation between itself and a contiguously assembled one of these isolator sections to sufficiently attenuate transmission of the flexural wave between the individual receiver elements. It has been determined by laboratory experiment that the arrangement shown in FIG. 1 will in fact provide sufficient acoustic attenuation between the individual receiver sections to substantially eliminate effects of flexural wave transmission along the instrument housing in the vicinity of the receivers.

The invention disclosed herein provides improved dipole receiver response by reducing acoustic coupling between individual receivers, yet has the tensile strength and rigidity in compression required in commercial use.

Those skilled in the art will devise other embodiments of this invention which do not depart from the spirit of the invention as disclosed herein. Accordingly, the invention should be limited in scope only by the attached claims.

What is claimed is:

1. A receiver array for an acoustic well logging instrument, comprising:

receiver sections including an outer shoulder at each end adapted to be placed in acoustically isolated contact with an internal shoulder of a connector coupling when said instrument is in tension, said outer shoulders including an acoustically isolating material disposed on a surface thereof, said receiver section including an inner shoulder at each end adapted to be placed in direct contact with an external shoulder of said connector coupling when said instrument is in compression;

one of said connector couplings disposed at each said end of said receiver sections to couple said receiver sections to each other and to a housing of said instrument; and a receiver element disposed in each of said receiver sections.

2. The instrument as defined in claim 1 wherein said receiver element comprises a bimporh dipole sensor.

3. The instrument as defined in claim 1 wherein said receiver element comprises a plurality of azimuthally separated elements, whereby signals from opposing pairs of said piezoelectric elements can be subtracted from each other to synthesize response of a dipole acoustic receiver.

4. The instrument as defined in claim 3 wherein signals from said azimuthally separated elements can be summed to synthesize response of a compressional acoustic receiver.

5. The instrument as defined in claim 1 wherein said receiver sections and said connector couplings include means for fixing an azimuthal orientation of said receiver sections, whereby a most flexible direction of said instrument can be positioned substantially perpendicular to a sensitive direction of said receiver elements.

6. A dipole acoustic well logging instrument comprising:
   an acoustic transmitter;
   receiver sections disposed at axially spaced apart locations from said acoustic transmitter, each of said receiver sections including an outer shoulder at each end adapted to be placed in acoustically isolated contact with an internal shoulder of a connector coupling when said instrument is in tension, said outer shoulders including an acoustically isolating material disposed on a surface thereof, said receiver section including an inner shoulder at each end adapted to be placed in direct contact with an external shoulder of said connector coupling when said instrument is in compression;
   one of said connector couplings disposed at each said end of said receiver sections to couple said receiver sections to each other and to a housing of said instrument; and
   a receiver element disposed in each of said receiver sections.

7. The dipole acoustic well logging instrument as defined in claim 6 wherein said receiver element comprises a bimporh dipole sensor.

8. The dipole acoustic well logging instrument as defined in claim 7 wherein said receiver element comprises a plurality of azimuthally separated elements, whereby signals from opposing pairs of said piezoelectric elements can be subtracted from each other to synthesize response of a dipole acoustic receiver.

9. The dipole acoustic well logging instrument as defined in claim 8 wherein signals from said azimuthally separated elements can be summed to synthesize response of a compressional acoustic receiver.

10. The dipole acoustic well logging instrument as defined in claim 6 wherein said receiver sections and said connector couplings include means for fixing an azimuthal orientation of said receiver sections, whereby a most flexible direction of said instrument can be positioned substantially perpendicular to a sensitive direction of said receiver elements.

11. The dipole acoustic well logging instrument as defined in claim 6 wherein said acoustic transmitter comprises a dipole acoustic energy source.

12. The dipole acoustic well logging instrument as defined in claim 11 further comprising a compressional acoustic energy source.

* * * * *